United States Patent [19]

Weidner

[11] 4,287,840
[45] Sep. 8, 1981

[54] TREE TRANSPLANTING METHOD AND APPARATUS THEREFOR

[76] Inventor: Barry Weidner, 153 E. Marion St., Doylestown, Ohio 44230

[21] Appl. No.: 131,208

[22] Filed: Mar. 17, 1980

[51] Int. Cl.³ .................... A01C 11/00; A01G 23/02
[52] U.S. Cl. ......................................... 111/1; 28/149; 29/281.1; 47/58; 47/76; 47/84; 53/390; 111/2; 111/4; 140/92.1; 150/52 R
[58] Field of Search ............... 111/1, 2, 4; 47/58, 47/73–78, 84; 37/2 R, 2 P; 53/390; 140/92.1; 29/281.1; 150/52 R, 52 F; 66/1, 1 A, 4; 242/43 R, 127, 115, 40.3; 434/83, 216; 28/149–152; 289/16.5

[56] References Cited

U.S. PATENT DOCUMENTS

| | | | |
|---|---|---|---|
| 357,197 | 2/1887 | Harsin | 47/76 |
| 548,614 | 10/1895 | Lassen | 47/67 X |
| 701,317 | 6/1902 | English | 242/115 X |
| 742,296 | 10/1903 | Delphey | 242/110.3 X |
| 776,040 | 11/1904 | Vilas | 28/150 |
| 1,380,327 | 5/1921 | Weil | 47/76 |
| 1,827,447 | 10/1931 | Wilmore | 47/76 |
| 2,022,607 | 11/1938 | Sorensen | 47/76 |
| 2,219,690 | 10/1940 | Leydecker | 47/76 |
| 2,573,770 | 11/1951 | Meadow | 150/28 |
| 2,634,532 | 4/1953 | Englert | 28/149 X |
| 2,719,351 | 10/1955 | Drummond | 28/289 X |
| 3,134,196 | 5/1964 | Hansen | 47/76 |
| 3,161,989 | 12/1964 | Sigler et al. | 47/76 |
| 3,316,675 | 5/1967 | Cartwright | 47/76 |
| 3,708,839 | 1/1973 | Prince | 28/150 |
| 4,062,148 | 12/1977 | Edmonds | 47/76 |
| 4,109,442 | 8/1978 | Maasbach | 53/390 |

FOREIGN PATENT DOCUMENTS 279548 10/1914 Fed. Rep. of Germany ..... 140/92.1
2505674 8/1976 Fed. Rep. of Germany .......... 47/76

*Primary Examiner*—James R. Feyrer
*Attorney, Agent, or Firm*—Frease & Bishop

[57] ABSTRACT

A wheel-like device enables a looped-strand drum lacing to be made thereon from two lengths of rope for use when forming a tree root ball of soil during transplanting of the tree. The device has a central hub with a plurality of outwardly projecting posts mounted thereon in a circular arrangement. A plurality of equally circumferentially spaced legs extend radially outwardly in a spoke-like fashion from the hub. Each of the legs have a peg mounted on the leg at a predetermined distance from the hub. A first piece of rope is looped about the hub posts and leg pegs to form a plurality of outwardly extending closed end loops. A second piece of rope is wrapped in an overlapping manner with the individual strands of the previously formed loops into a circular configuration about the hub posts to form a circular drum lacing base. The two pieces of rope are stapled together at alternating overlapped locations. The preformed drum lacing is placed in the interior of a wire basket formed by two detachably connected half-sections. A sheet of burlap is placed over the open top of the basket and drum lacing and the tree roots and soil ball are placed in the basket which forms the burlap sheet about the soil. The burlap sheet then is tied about the ball of soil and to the tree trunk by the drum lacing. The basket halves then are disconnected and the balled tree then is transported to the new tree site for replanting.

3 Claims, 12 Drawing Figures

U.S. Patent  Sep. 8, 1981  Sheet 1 of 3  4,287,840
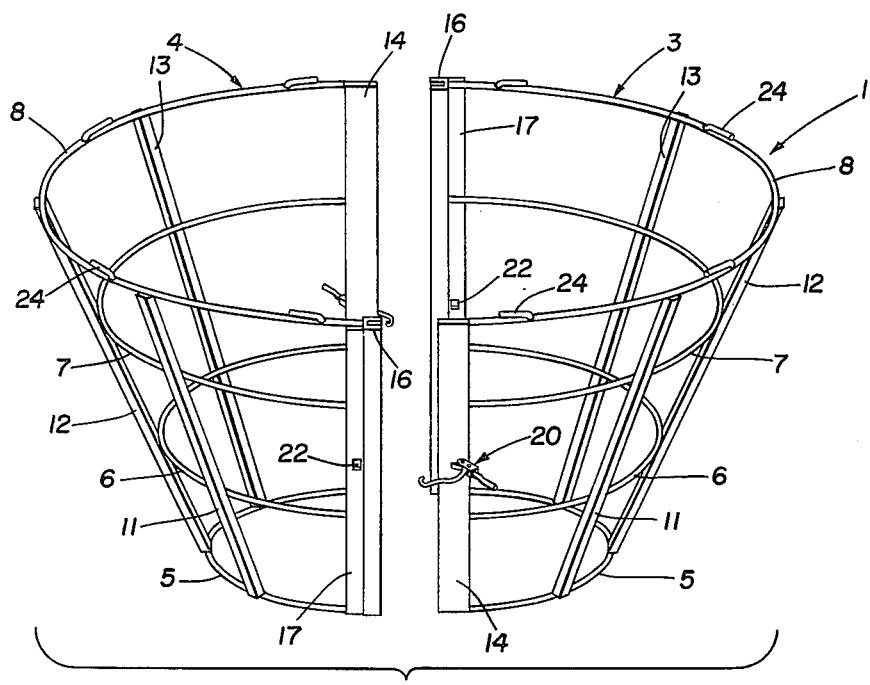
FIG.1
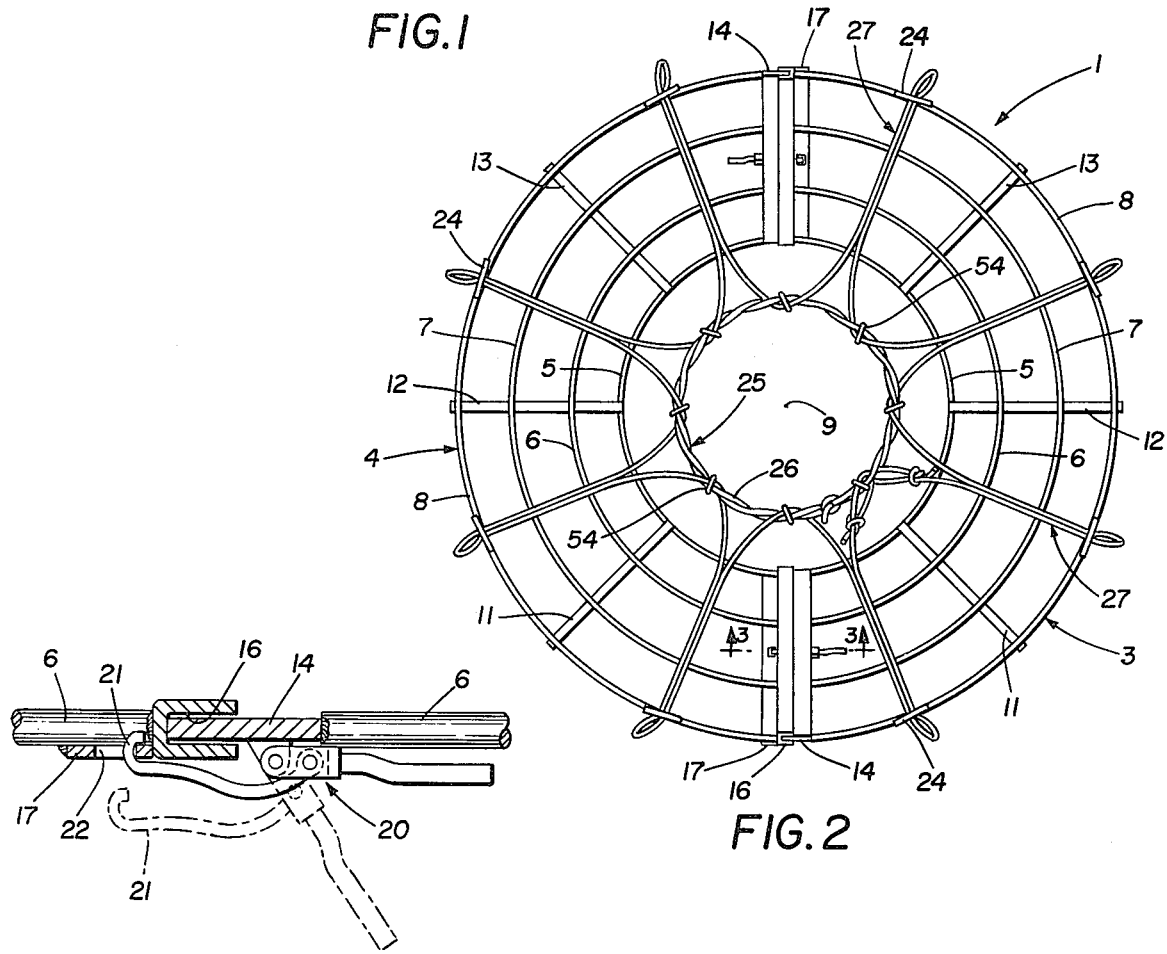
FIG.2
FIG.3

TREE TRANSPLANTING METHOD AND APPARATUS THEREFOR

BACKGROUND OF THE INVENTION

1. Field of the Invention

The invention relates to apparatus for use in transplanting trees, and to a new method for using the same. More particularly, the invention relates to a new apparatus for manufacturing preformed looped-strand drum lacings which are used in combination with a wire basket for wrapping the roots of trees and shrubs in a ball of soil for transplanting the same.

2. Description of the Prior Art

Various types of apparatus and devices have been developed for transplanting trees, as well as various transplanting methods in which such apparatus may or may not be used. Many of these prior art devices are used primarily for balling the tree roots during the transplanting of the trees. Examples of such prior art devices, apparatus and methods are shown in U.S. Pat. Nos. 357,197, 1,380,327, 1,827,447, 2,022,607, 2,219,690, 3,134,196, 3,161,989, 3,316,675 and 4,062,148.

In commercial nursery operations, trees are dug from the ground for subsequent transplanting at a remote location by a large mechanical digger in which a plurality of spades or blades dig into the earth around the tree. The spades are subsequently lifted out of the ground bringing with them a ball of earth which surrounds the tree roots. It is desirable to retain as much of this ball of earth or soil as possible about the tree roots when the tree is transplanted to increase the chances that the transplanted tree will survive and flourish.

It is well known in the tree transplanting art that these balls of earth or soil are wrapped in burlap material or a similar sheet material for retaining the ball of soil about the tree roots. One common practice is to place the wrapped tree base in a wire basket, such as shown in U.S. Pat. No. 4,062,145, which is placed in the ground along with the tree roots. This procedure requires a basket that is used only one time since it remains in the ground. Also, a considerable length of time is required before the basket completely rusts away in the ground, which presents a dangerous situation if other digging is done subsequently in the area of the transplanted tree. Wrapping of the tree roots in a sheet of material is required for most transplanting applications, especially where the soil about the tree roots is exceptionally wet or dry, or contains a large percentage of sand or gravel.

Most of the known tree transplanting apparatus, and in particular, the ball forming or containing baskets, have been too expensive and bulky to be used efficiently and conveniently, especially since the baskets are intended for a single transplanting operation.

It is desirable that the burlap or sheet material used for wrapping the tree roots be secured about the tree by some type of fastening means to prevent the ball of soil surrounding the roots from losing its shape and falling away from the roots. One type of device for wrapping the tree roots is shown in U.S. Pat. No. 3,316,675. This device preferably is formed of flexible wire, with a burlap sheet being taped to the formed wire to form a supporting basket-like member. Although this device may be satisfactory for certain applications, the use of wire is more expensive than rope, especially to form a sufficiently rigid container for large trees. Also no means is shown for the rapid and inexpensive fabrication of such looped-strand members.

Accordingly, the need has existed for improved apparatus and method for transplanting trees which eliminates many of the problems encountered with prior art methods and apparatus described above.

SUMMARY OF THE INVENTION

Objectives of the invention include providing improved apparatus for use in transplanting trees, and particularly for use in manufacturing the looped-strand drum lacing used for forming the tree root ball of soil for the tree being transplanted, which is used in cooperation with a wire basket formed of two half basket sections, which sections are removably connected together for holding and forming the tree root ball while wrapping the same with a sheet of material and during tying of the drum lacing thereabout; providing such improved tree transplanting apparatus in which the tree ball forming basket can be used repeatedly for forming numerous tree balls when transplanting trees and need not be transported with the balled trees to the new tree sites; providing such improved tree transplanting apparatus in which an extremely inexpensive and efficient drum lacing formed of rope is placed within the basket and temporarily secured thereto for receiving the sheet of wrapping material therein prior to placing the tree roots and attached soil in the basket; providing such improved tree transplanting apparatus in which the drum lacing is formed in a rapid, convenient and inexpensive manner not believed heretofore possible for producing such drum lacings on a unique wheel-like device; providing such improved tree transplanting apparatus in which the drum lacing forming device can be used for forming drum lacings of various loop sizes for different tree sizes by a simple adjustment provided on the device, in which a quantity of drum lacings can be produced by the device at a site remote from the tree digging or transplanting site and transported to the tree digging site conveniently for use at the site along with the single detachable wire basket; and providing such improved tree transplanting apparatus and a method of using the same which substantially reduces transplanting costs, which eliminates difficulties existing in the art, satisfies needs and obtains new results in the tree transplanting art.

These objectives and advantages are obtained by the improved apparatus for producing a looped-strand drum lacing member for use in transplanting trees, said apparatus including a center hub; a plurality of posts mounted on the hub in a circular configuration and projecting outwardly from said hub; a plurality of circumferentially spaced legs extending radially outwardly from the hub; a peg mounted on each of the legs at a predetermined radial distance from the hub and projecting outwardly from the legs in the same direction as the posts, said posts and legs being adapted to have a rope looped thereabout in a predetermined manner to form the looped-strand drum lacing member; a first piece of rope being looped about each of the center hub posts and along each of the legs and about the pegs to form a plurality of closed end loops, one on each of the legs; and a second piece of rope being woven into a circular arrangement about the center hub posts and in an overlapping relationship with portions of the first piece of rope, with said first and second ropes being joined at certain overlapped areas by staples to form the drum lacing having a circular base with a plurality of outwardly radially extending closed end loops.

These objectives and advantages are obtained further by the improved method of transplanting trees, the general nature of which may be stated as including the steps of forming a drum lacing having a circular strand base and a plurality of closed end loops connected to the base and extending radially outwardly from said base; providing an open top wire basket formed by two half basket sections detachably joined together; placing the drum lacing in the wire basket; placing a sheet of flexible material over the drum lacing and open top of the basket; placing the roots of a tree and attached ball of soil into the basket; wrapping the sheet of flexible material about the ball of soil and tree roots; tying the drum lacing loops about the sheet of flexible material and to the trunk of the tree to securely confine the tree roots and soil ball within the sheet of material; detaching the wire basket and removing the wrapped tree therefrom; transporting the tree to a transplanting site; and replanting the wrapped tree at said transplanting site.

BRIEF DESCRIPTION OF THE DRAWINGS

A preferred embodiment of the invention-illustrative of the best mode in which applicant has contemplated applying the principles-is set forth in the following description and shown in the accompanying drawings, and is particularly and distinctly pointed out and set forth in the appended claims.

FIG. 1 is an exploded perspective view of the improved tree baskets in separated condition, which is used in the improved tree transplanting method;

FIG. 2 is a top plan view of the tree basket shown in FIG. 1, in assembled condition with one of the drum lacings being placed in the basket prior to placing a burlap sheet therein;

FIG. 3 is an enlarged fragmentary sectional view taken on line 3—3, FIG. 2, showing the tree basket closure mechanism in full lines in closed position and in dot-dash lines in open position;

Similar numerals refer to similar parts throughout the drawings.

DESCRIPTION OF THE PREFERRED EMBODIMENT

Figure 4:
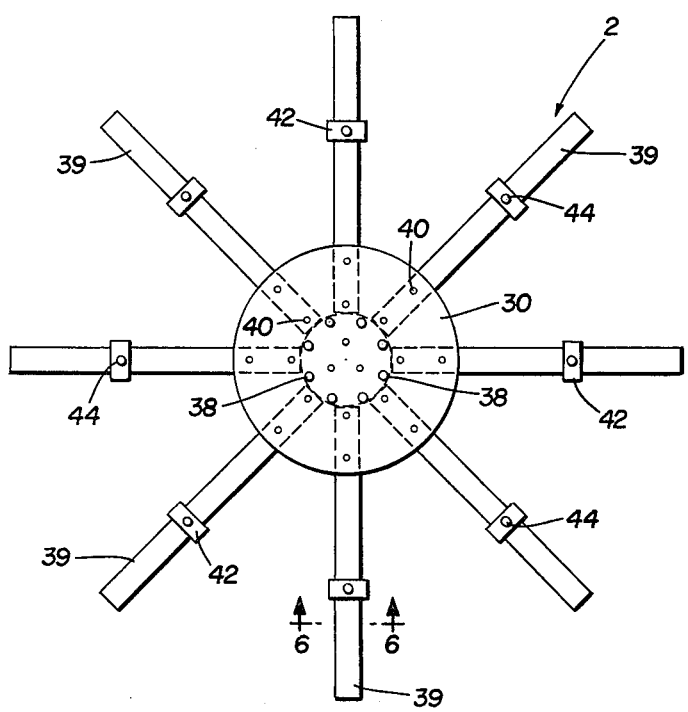
FIG. 4 is a front elevational view of the improved drum lacing forming apparatus.

The improved apparatus for use in the improved tree planting method consists of a detachable wire basket, indicated generally at 1 (FIGS. 1-3), and a drum lacing forming device, indicated generally at 2 (FIGS. 4-8).

Basket 1 is formed by two half-basket sections 3 and 4 which preferably are identical to each other, thereby reducing the manufacturing costs thereof and inventory. Accordingly, only one half-basket section will be described in detail, and the designating numerals and description will apply equally to the other half-basket section.

Each basket section has a generally inwardly tapered or half conical configuration and is formed by a plurality of vertically spaced semicircular ring-forming members. These members are formed of rigid wire and consist of a bottom member 5, a pair of intermediate members 6 and 7, and a top member 8. The centers of these ring-forming members 5-8 lie on a straight line, indicated by point 9 (FIG. 2), which is the central axis of basket 1 when sections 3 and 4 are joined together. The plane of each ring-forming member 5-8 is disposed perpendicular to axis 9 and is attached by welding or other fastening means to three intermediate, upwardly projecting rods 11, 12 and 13.

An elongated, flat metal plate 14 (FIG. 3) is welded to one end of rings 5-8 too form a tongue which is slidably received within a U-shaped groove 16 formed on the outer end of another flat metal plate 17, which is attached to and extends between the other ends of rings 5-8 of the other basket half section. Plates 14 and 17 extend upwardly, outwardly at a predetermined angle of inclination, as do intermediate rods 11, 12 and 13, and together with rods 11-13, form a rigid half-basket section. Basket 1 also can formed with only one intermediate ring instead of the pair of intermediate rings 6 and 7, shown in the drawings, as well as replacing the three tapered rods 11, 12 and 13 with only two such rods, if desired, for use with various size trees.

Figure 10:
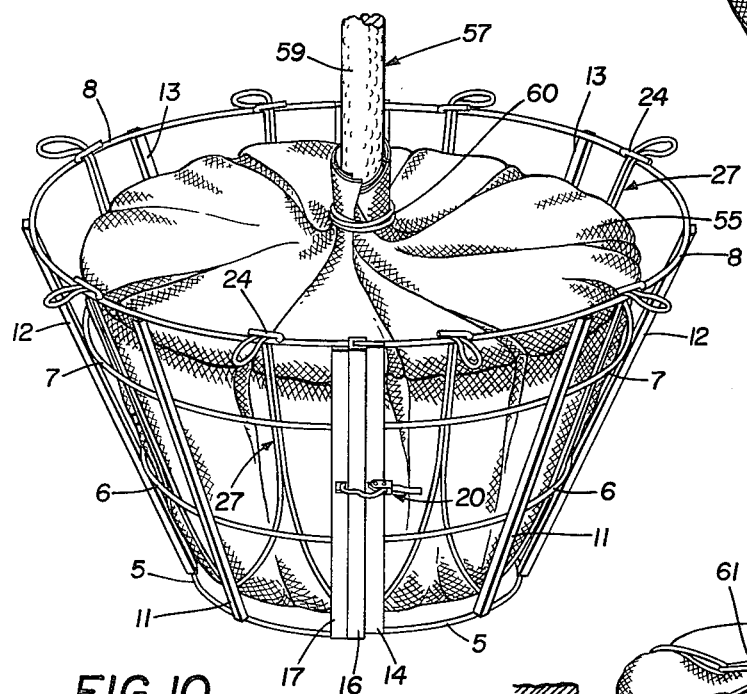
FIG. 10 is a diagrammatic perspective view similar to FIG. 9, showing the next step of the improved tree transplanting method in which the tree root ball of soil is wrapped in the flexible sheet and secured to the tree trunk.

A toggle latch 20 is mounted on plate 14 and has a hook-shaped lever 21 pivotally mounted thereon which is engageable in an opening 22 formed in plate 17. Basket sections 3 and 4 are joined together easily by inserting the outer edges of plates 14 in grooves 16 of plates 17 with toggle levers 21 being inserted in opposite plate openings 22. Toggle latches 20 then are moved from the open dot-dash line position of FIG. 3 to the closed full line position to rigidly clamp the two half-basket sections together for use in forming the tree root ball, as described below. When in connected position, ring members 5-8 form four vertically spaced circular rings, as shown in FIGS. 2 and 10.

A plurality of tabs 24 (FIG. 1) are attached to the top basket ring members 8 and are spaced equall circumferentially therealong for holding the closed ends of the individual loops of a drum lacing 25 when placed therein, as shown in FIG. 2.

Drum lacing 25 (FIG. 2) is formed by a circular, preferably double stranded, base portion 26 and a plurality of radially, outwardly extending closed end loops 27. Eight loops 27 are provided in the particular embodiment of drum lacing 25, shown in the drawings. Drum lacing 25 is formed of lightweight rope or twine and can be of various thicknesses and strengths and is formed by the unique drum lacing forming device 2, shown in FIGS. 4–8.

Figure 5:
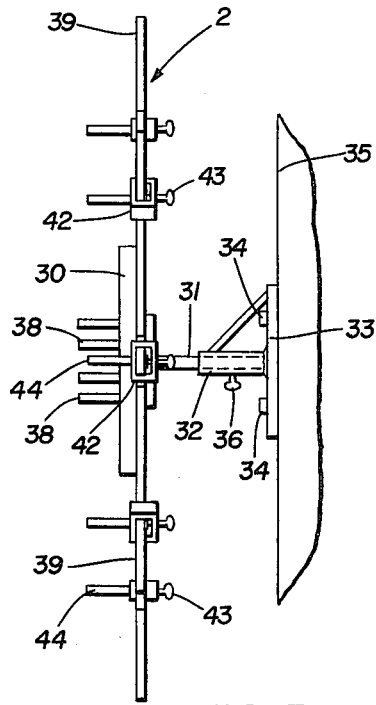
FIG. 5 is a right-hand side view of the drum lacing forming apparatus of FIG. 4, shown mounted on a supporting structure.

Device 2 preferably is formed of wood or lightweight metal and includes a central disc-shaped hub 30, which is mounted on the end of a horizontally extending shaft 31 (FIG. 5). Shaft 31 is telescopically mounted in a sleeve 32 which is attached to a bracket 33 that is mounted by bolts 34 to a wall or other upstanding member 35. Shaft 31 may be clamped within sleeve 32 by a thumbscrew 36 or can be freely rotatably mounted therein by loosening of thumb screw 36 without effecting the use of device 2.

Figure 6:
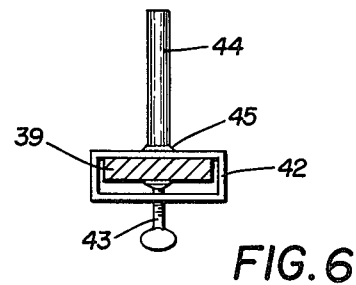
FIG. 6 is an enlarged sectional view taken on line 6—6, FIG. 4.
Figure 7:
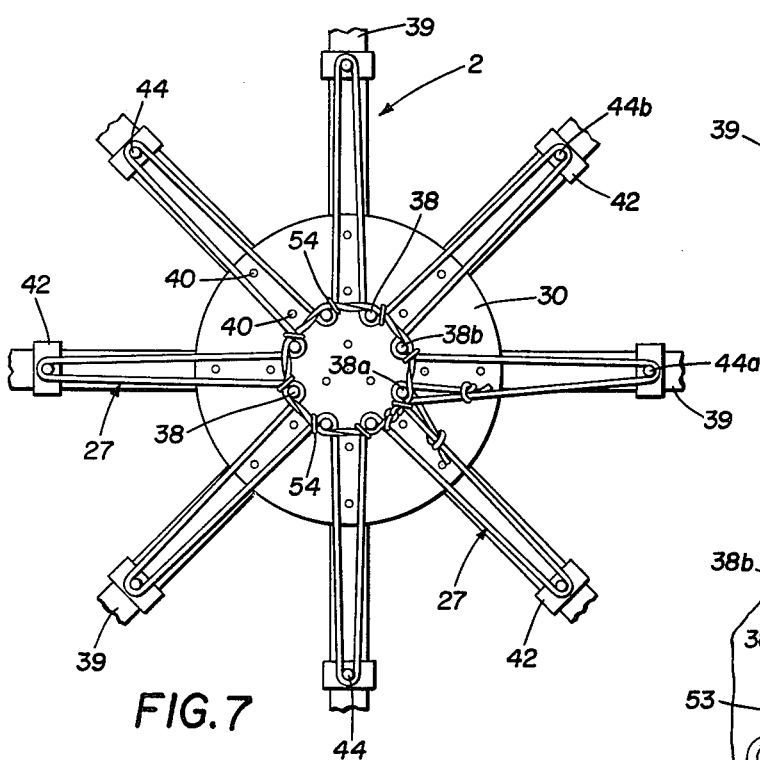
FIG. 7 is an enlarged fragmentary front elevational view of the drum lacing forming apparatus of FIG. 4, with a drum lacing being shown formed thereon.

A plurality of posts 38 are mounted on hub 30 in an equally spaced circular configuration and project horizontally outwardly therefrom. Eight posts are shown in the preferred embodiment which is illustrated in the drawings. A plurality of circumferentially spaced legs 39 are attached to central hub 30 by bolts 40 or other attachment means and extend radially outwardly from hub 30 in a spoke-like arrangement. Legs 39 are equally circumferentially spaced with respect to each other and lie in a common vertical plane, as can be seen in FIG. 5. Eight legs 39 are shown in the particular embodiment of the drawings and are equal in number to the number of posts 38 mounted on hub 30. Legs 39 are elongated members preferably having a rectangular cross-sectional configuration, as shown in FIG. 6. A bracket 42 is adjustably mounted on each leg 39 by a thumbscrew 43. A peg 44 is attached to each bracket 42 by a weld 45 and extends outwardly therefrom in the same direction as central hub posts 38.

Figure 8:
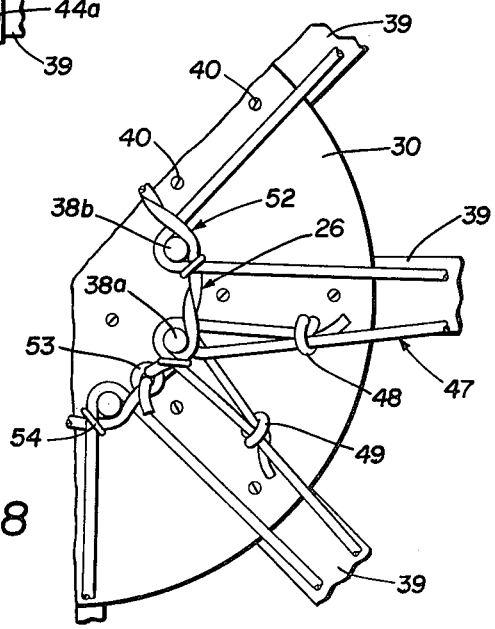
FIG. 8 is an enlarged fragmentary view of a portion of FIG. 7, showing a part of the drum lacing on the apparatus of FIGS. 4 and 7.

Drum lacing 25 is formed on device 2 in an extremely simple and efficient manner, as described below. Brackets 42 are adjusted to the same predetermined radial distance from hub 30 on legs 39 and clamped thereon by thumbscrew 43. A first piece of rope 47 is looped about one of the hub posts 38, the particular one of which is shown in FIG. 8 and designated as 38a, and secured thereon by a knot 48. Rope 47 then is extended outwardly along the adjacent leg 39 and looped around the leg peg, indicated by numeral 44a (FIG. 7), and then downwardly along the leg and about the adjacent post 38b and then outwardly along the next adjacent leg 39 and looped around the leg peg 44b. This loop-forming procedure continues until rope 47 forms a loop 27 about each leg peg 44 and adjacent post 38. When rope 47 completes its loop-forming cycle and reaches posts 38a, it is tied off in another knot 49. This procedure forms eight looped strands 27, which are of equal length with closed ends.

A second piece of rope 52 then is trained about hub posts 38 into a circular configuration to form drum lacing base 26. When placing rope 52 about posts 38, it is woven in an overlapping arrangement with the individual strands of the previously formed loops 27. Rope 52 is tied off on itself by a knot 53 when the circular woven arrangement is finished, as shown in FIG. 8. The particular piece of rope 52 which is shown in the drawings, is formed by two pieces of rope which are twisted upon themselves to form a stronger section of rope for forming the drum lacing base 26. If desired, a single thickness piece of rope 52 may be used to form base 26.

A nurseryman can form a plurality of preformed drum lacings 25 easily by manually performing the above-described steps. If desired, the nurseryman can initially form drum lacing base 26 and then form loops 27 by overlapping the loop strands with base 26 to provide the overlapping arrangement shown in FIGS. 7 and 8, instead of the reverse order described above. The nurseryman may wish to rotatably mount hub 30 and legs 39 on wall 35 by loosening thumbscrew 36 to facilitate his forming of the various loops and drum lacing base or he may maintain the same in a fixed nonrotatable condition depending upon his particular preference.

After forming drum lacing base 26 and loops 27, one side of each drum loop 27 is secured to base 26 by a clamp or staple 54. Clamp 54 may be a circular staple, which is applied and clamped tightly about the overlapped rope strands by a usual ring stapling gun. Clamps 54 properly position each loop 27 on base 26 to prevent their disengagement from the equally spaced positions thereon. Accordingly, an operator may form a number of these preformed drum lacings 25 at a site completely remote and separate from the tree digging or transplanting location at any time convenient to him in order to obtain a quantity of these drum lacings for the subsequent transplanting of trees.

Improved wire basket 1 and drum lacing forming device 2 provide an important function in the improved tree transplanting method described below and shown particularly in FIGS. 2 and 9 through 12 of the drawings. A wire basket 1 is placed in a closed, assembled condition with toggles 20 tightly clamping basket sections 3 and 4 together, as shown in FIG. 2. A preformed drum lacing 25, formed by the improved method and apparatus described above, is placed in basket 1. The outer ends of the individual loops 27 are wedgingly inserted beneath tabs 24 to removably hold the same in the desired tree root receiving position. In this position, drum lacing base 26 will lie within the center of basket 1 and will be resting on or supported by the ground or surface on which basket 1 is placed, so that no pressure is applied on the strand loops 27 when the tree roots are placed therein. Thus, lacing 25 will hang loosely within the interior of basket 1 with the loops 27 extending along the interior of the basket against the wire rings with base 26 lying loosely on the supporting surface. Tabs 24 provide a convenient means of properly positioning and temporarily holding loops 27 until the tree roots are placed in the basket and wrapped.

Next, a sheet of material 55 is placed over the open top of basket 1. Sheet 55 preferably is formed of burlap or other inexpensive biodegradable sheet material which is sufficiently strong to prevent tearing when the tree roots and soil ball are placed therein. The above steps are performed generally adjacent to the tree which is being dug up for subsequent transplanting at a different site.

Figure 9:
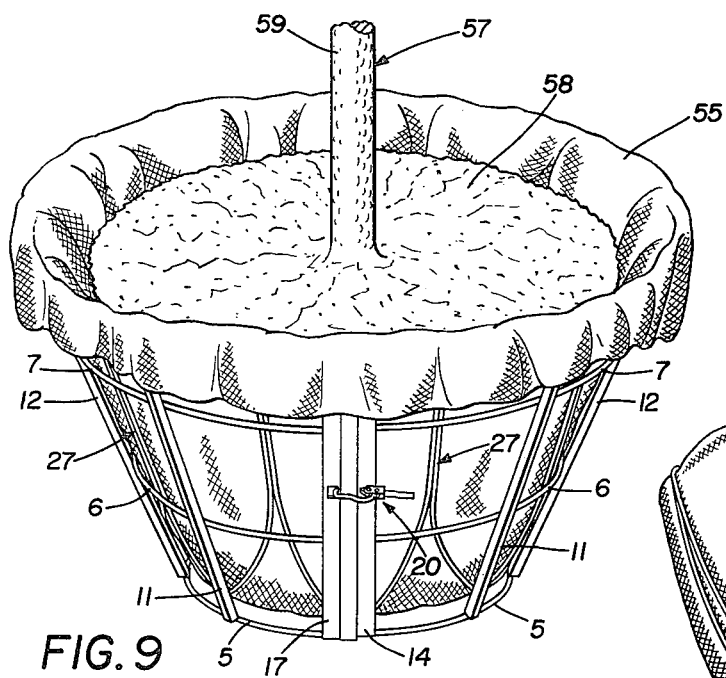
FIG. 9 is a diagrammatic perspective view showing the improved tree basket having a drum lacing and flexible sheet of material placed therein, partially enclosing the tree roots and attached ball of soil prior to wrapping the ball of soil with the flexible sheet in the improved tree transplanting method.

A tree 57 then is dug from the ground, usually by a mechanical digger, which removes with the tree a large ball of soil 58 surrounding the tree roots. The tree roots and soil ball are placed gently on the top of the basket and burlap sheet and lowered into the basket. The sheet of burlap is pulled into the basket with the soil ball until the tree and soil ball 58 settle in the basket and assume the general position, as shown in FIG. 9. The diameter of burlap sheet 55 is sufficiently large so that its outer periphery will assume the general position of that of FIG. 9 to provide enough material, which is wrapped about tree trunk 59, as shown in FIG. 10, to provide a complete cover and enclosure for the top of the soil ball 58.

Figure 11:
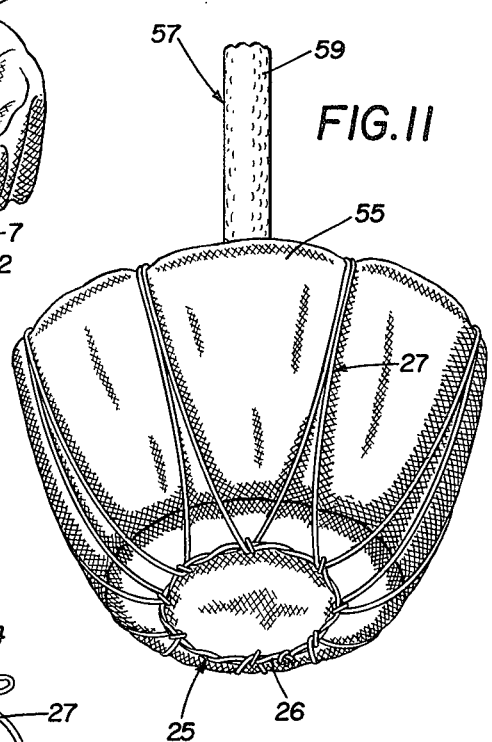
FIG. 11 is a diagrammatic perspective view showing the bottom portion of the drum lacing securing the sheet of flexible material about the tree root ball after it is removed from the wire basket of FIGS. 9 and 10.
Figure 12:
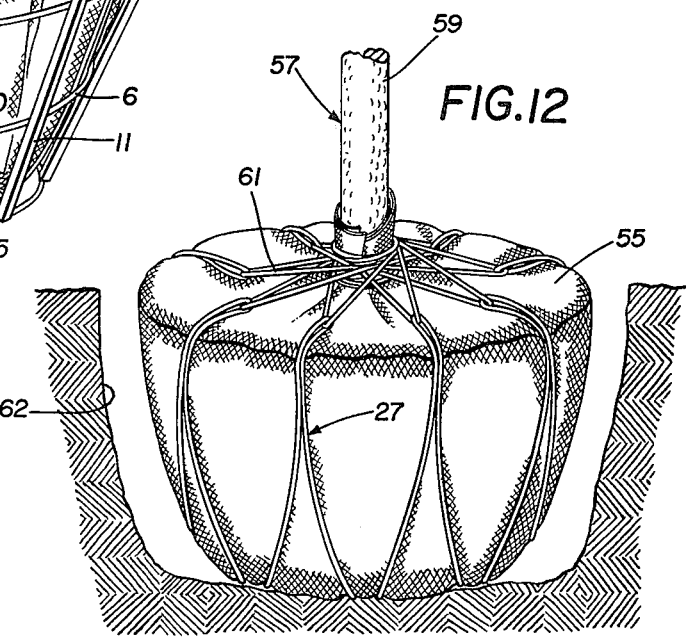
FIG. 12 is a perspective view showing the final step of the improved transplanting method in which the wrapped tree root ball formed by the method shown in FIGS. 9, 10 and 11, is placed in a hole in the ground for transplanting the same.

The outer area of burlap sheet 55 is folded over the top of tree ball 58 and attached about tree trunk 59 by a short section of rope or wire 60 to completely enclose soil ball 58. The closed ends of drum lacing loops 27 then are removed from beneath tabs 24 and pulled tightly against the sides and over the top edges of the wrapped tree root ball by another piece of rope 61, which is subsequently tied about trunk 59 (FIG. 12) to completely and securely enclose and tightly wrap tree root ball 58, which assumes the somewhat conical configuration of basket 1, as shown in FIGS. 11 and 12. Drum lacing base 26 provides a large supporting circular member for the bottom of soil ball 58 with loops 27 retaining the sides of ball 58 in the conical configuration. The above-discussed steps are performed at the tree digging site.

The dug and wrapped tree then can be transported to the transplanting site, and if handled with sufficient care, the wrapped soil ball 58 will maintain the formed conical shape imparted by basket 1 until placed in a hole 62 (FIG. 12) dug in the ground for receiving the same. The balled tree is merely removed from the transporting truck and placed within hole 62, with hole 62 being filled in and around the wrapped tree root ball completely covering the same with soil.

Preferably, ropes 60 and 61, which secure burlap sheet 55 to tree trunk 59, are removed and that portion of sheet 55 which covers the top of soil ball 58 is pulled back and dropped into hole 62 with the top of soil ball 58 being level with the top of hole 62. After hole 62 is completely filled with soil, mulch is placed across the top of soil ball 58 generally level with the top of hole 62. Drum lacing 25 and burlap sheet 55 will decompose within a relatively short period of time, permitting the tree roots to expand and grow unrestrained.

The improved methods and apparatus discussed above have a number of advantages. Wire basket 1 can be used repeatedly for forming the tree balls and is not transported with the tree ball and placed in the ground, as in some prior transplanting methods. Also, basket 1 is disconnected easily from about the tree ball after it is securely wrapped in the burlap sheet prior to transporting the wrapped tree to the transplanting site. This eliminates the removal of the basket from the tree ball after it has been placed in the hole, as in other prior transplanting methods. Basket 1 also can be formed in several sizes which will accommodate nearly all sizes of trees which are transplanted. Therefore, only several baskets are required for nearly all tree transplanting applications and since the baskets are formed of relatively indestructible rigid metal bars and rods, they will last for a considerable length of time and repeated uses.

Drum lacing forming device 2 enables a number of preformed drum lacings 25 to be manufactured by a nurseryman at a convenient time and place completely unrelated to either the tree removal or transplanting sites. The drum lacings are formed of extremely inexpensive and readily available rope which can be chosen to have sufficient strength to securely bind the tree ball in its formed condition and yet will decompose within a relatively short period of time after being placed in the ground when the tree is transplanted. This eliminates any possible dangerous conditions from existing, as in those tree transplanting methods wherein the wire basket remains in the ground with the tree ball. Drum lacing forming device 2 can be formed relatively inexpensively of wood or sheet metal, is relatively maintenance free, and can be mounted on any readily available supporting structure and requires limited space. Device 2 enables the lengths of the drum lacing loops to be adjusted easily for any particular size tree by movement of brackets 42 and their pegs 44 along the loop forming legs.

Accordingly, the improved tree transplanting method, apparatus and procedures therefor provide effective, safe, inexpensive, and efficient procedures and devices which achieve all the enumerated objectives, provide for eliminating difficulties encountered with prior procedures and devices, and solve problems and obtain new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the drum lacings are made and trees are transplanted, and the characteristics of the new and improved constructions, and the advantageous, new and useful results obtained; the new and useful structures, devices, elements, arrangements, parts, combinations, procedures and methods are set forth in the appended claims.

I claim:

1. An improved method of packaging and transplanting trees including the steps of:
   (a) forming a drum lacing of fibrous rope material having a circular rope base and a plurality of closed end rope loops connected to the base and extending radially outwardly from said base;
   (b) providing an open top wire basket formed by two half-basket sections detachably joined together to form a downwardly, inwardly sloping interior;
   (c) suspending the drum lacing within the wire basket by said closed end loops;
   (d) placing a sheet of flexible material over the drum lacing and open top of the basket;
   (e) placing the roots of a tree and attached ball of soil into the basket;
   (f) wrapping the sheet of flexible material about the ball of soil and tree roots;
   (g) tying the drum lacing loops about the sheet of flexible material and to the trunk of the tree to securely confine the tree roots and soil ball within the sheet of material;
   (h) detaching the wire basket and removing the wrapped tree therefrom;
   (i) transporting the tree to a transplanting site; and
   (j) replanting the wrapped tree at said transplanting site.

2. The transplanting method defined in claim 1 including the step of removably attaching the loops of the drum lacing to the top of the wire basket prior to the placing of the sheet of material over said drum lacing.

3. The transplanting method defined in claim 2 in which the loops of the drum lacing are removably attached to the top of the wire basket by wedging each of the loops adjacent their closed ends beneath a respective tab formed on the top of said basket.

* * * * *